No. 823,341. PATENTED JUNE 12, 1906.
F. N. LIVINGSTON.
MECHANICAL MOVEMENT.
APPLICATION FILED AUG. 25, 1905.
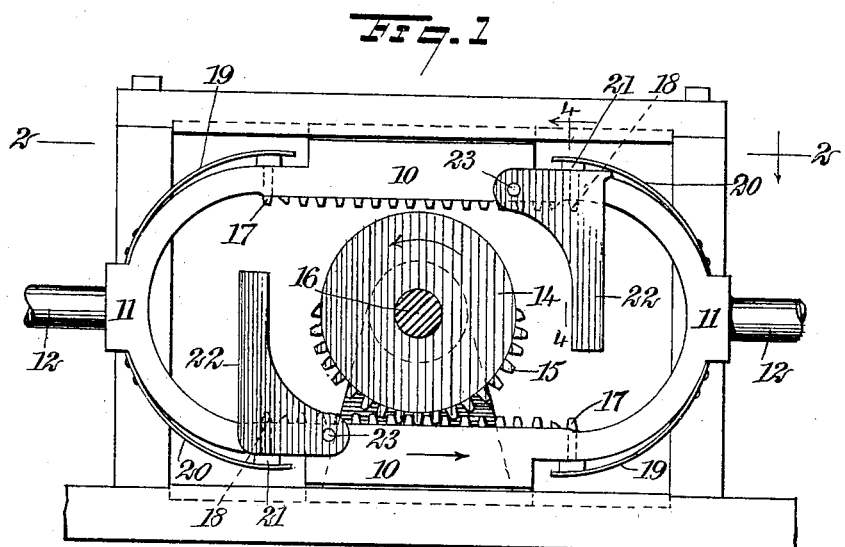
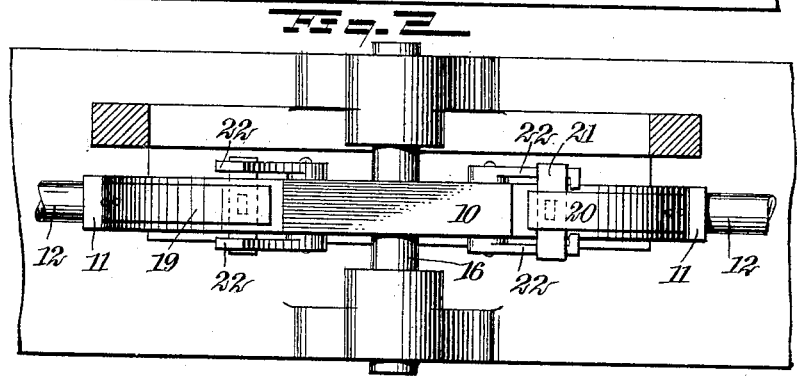
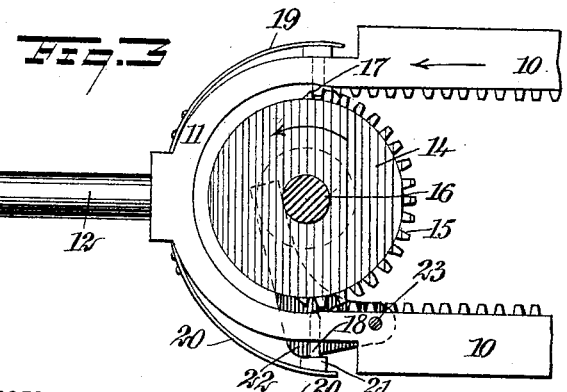
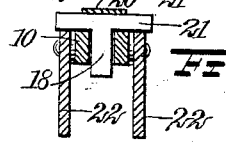
WITNESSES:
INVENTOR
Fred N. Livingston
BY
ATTORNEYS

UNITED STATES PATENT OFFICE.

FRED NEVELL LIVINGSTON, OF BALLARD, WASHINGTON.

MECHANICAL MOVEMENT.

No. 823,341.  Specification of Letters Patent.  Patented June 12, 1906.

Application filed August 25, 1905. Serial No. 275,747.

*To all whom it may concern:*

Be it known that I, FRED NEVELL LIVINGSTON, a citizen of the United States, and a resident of Ballard, in the county of King and State of Washington, have invented a new and Improved Mechanical Movement, of which the following is a full, clear, and exact description.

The invention relates to a new mechanism for transforming reciprocatory into continuous rotary motion, and, conversely, for transforming continuous rotary into reciprocatory motion.

It is useful principally as a substitute for the crank-shaft, although it may be put to other uses, as will suggest themselves to skilled mechanics.

The invention resides in certain special features of construction and arrangement of parts, which will be fully set forth hereinafter and particularly pointed out in the claims.

Reference is had to the accompanying drawings, which illustrate, as an example, the preferred embodiment of my invention, in which—

Figure 1 is a side elevation of the invention. Fig. 2 is a sectional plan looking down from the line 2 2 of Fig. 1. Fig. 3 is a detail view showing the parts in the position which they assume when the reciprocating element is about to reverse its movement. Fig. 4 is a section on the line 4 4 of Fig. 1.

The specific embodiment of the invention, especially the framing, bearings, and smaller parts, is in no way essential and will not be particularly described in this specification. It may also be observed that while the invention is here shown as embodying toothed gears, which are considered preferable, the invention is not, however, limited to gears of this form, and other gears—such, for instance, as friction-gears—may be employed, if desired.

The invention involves two racks 10, which are disposed in parallelism opposite each other and are rigidly joined together, these racks furnishing the essentialities of the reciprocating member. As here shown, said racks are joined rigidly by yokes 11, to which shafts 12, for transmitting the reciprocating movement, may be connected. Located between and coacting with the racks is a gear 14, which has half of its periphery formed with teeth 15, arranged to mesh with the teeth of the racks 10. The gear 14 is carried on a shaft 16, which is intended to be revolubly driven from the reciprocating members 10. Each rack 10 is provided at each end with one or more retractable teeth. As here shown, the racks have one movable tooth at each end. These teeth are designated 17 and 18 on each rack. The teeth 17 are arranged to move in and out of active position and are yieldingly pressed into active position by springs 19. Said teeth 17 are arranged in opposite position with respect to each other, as shown in Fig. 1. The teeth 18 are also arranged in opposite positions with respect to each other and are retractable like the teeth 17. The teeth 18 are pressed into active position by springs 20, and said teeth have connected thereto cross-pieces 21, which are engaged by tappet-arms 22. Said tappet-arms are pivoted to the racks 10 at the points 23 and project inward, so that when moving with the racks they will respectively engage the shaft 16 at the ends of the movement of the racks. As said tappets 22 strike the shaft 16 they will bear against the cross-pieces 21 and withdraw the teeth 18. As the drawings illustrate, the stationary rack-teeth directly opposite to the movable teeth are cornered off or tapered slightly at the side adjacent to the movable teeth, and the end teeth on the gear 14 are similarly shaped.

The operation of the apparatus may be traced as follows: Assume that the parts are moving in the direction of the arrows applied to Fig. 1. When the racks 10 reach the limit of their rightward movement, the right-hand tappets 22 will strike the shaft 16 and said tappets will be thrown downward, withdrawing the left-hand tooth 18. Simultaneously the right-hand end tooth on the gear 14 will strike the yieldingly-sustained tooth 17 on the upper rack 10 and cause said tooth to move backward sufficiently to allow said tooth of the gear to ride under said tooth 17, the tooth 17 of the upper rack 10 coming back under the action of this spring between the two end teeth at the right-hand side of the gear 14, referring to Fig. 1. It will thus be seen that when the parts reach the limit of their rightward movement the top rack will be engaged with the gear and the bottom rack will be disengaged therefrom. This operation is illustrated in Fig. 3, where the right-hand tappets 22 are shown thrown downward and the tooth 18 of the gear 10 retracted, thus disengaging the bottom rack from the gear 14. Fig. 3 also shows that the tooth 17 of the upper rack is sprung in between the two end teeth at the bottom of the gear 14. The racks 10 thus reverse their movement, and the shaft 16 is given a second half-revolution, whereupon the above-described operation is repeated with respect, however, to the teeth 17 and 18 at the right-hand ends of the racks as contradistinguished from the teeth 17 and 18 at the left-hand ends of the racks. It will be seen, therefore, that the essential part of my invention resides in imparting continuous rotary movement to a mutilated gear by means of opposite reciprocating racks between which the gear is located and by the employment of one or more movable teeth which enable the racks to engage or disengage the gear, according to the position of the parts. This provides an effective means for transforming the motion, and it has the prominent advantage of offering a crank substitution in which there is no dead-center, the force of the reciprocating element being exerted on the gear at all times at right angles to the line of movement of the driving element or, in other words, at the point where the greatest effort may be exerted.

By slightly cornering off or tapering of the teeth of the gear and the racks, as before explained, I am enabled to employ but one movable tooth at each end of each rack. It is pointed out, however, that two or more movable teeth may be employed at each end of the racks with good results. It will also be observed that the invention may be employed for transmitting rotary and reciprocating motion by a mere reversal of the operation above described.

Having thus described the preferred form of my invention, what I claim as new, and desire to secure by Letters Patent, is—

1. The combination of a mutilated toothed gear, two toothed racks connected to reciprocate in unison and lying at opposite sides of the gear, said racks having movable teeth, and means for automatically moving said teeth.

2. The combination of a mutilated toothed gear, two toothed racks connected to reciprocate in unison and lying at opposite sides of the gear, each rack having a movable tooth at each end, means for yieldingly pressing said teeth into active position, and means in connection with one movable tooth of each rack for automatically retracting said teeth upon a change in the direction of movement of the racks, said means being located at opposite sides of the center of the gear.

3. The combination of a mutilated toothed gear, two toothed racks connected to reciprocate in unison and lying at opposite sides of the gear, each rack having a movable tooth at each end, means for yieldingly pressing said teeth into active position, and means in connection with one movable tooth of each rack for automatically retracting said teeth upon a change in the direction of movement of the racks, said means being located at opposite sides of the center of the gear, and said means consisting in tappets pivoted to the racks and adapted to engage a relatively stationary part.

4. The combination of a mutilated toothed gear, the end teeth of which are cornered off or inclined, two toothed racks connected to reciprocate in unison engaging opposite sides of the gear, each rack having a movable tooth at each end, means for yieldingly pressing said teeth into position, and means in connection with one tooth of each rack for automatically retracting said teeth, said means lying at opposite sides of the center of the gear and adapted to engage a relatively stationary part.

5. The combination of a toothed gear adapted to rotate, two toothed racks connected to reciprocate in unison, said racks having movable portions, and means for automatically disengaging the movable portions of one rack from the gear and engaging the movable portion of the rack with the gear upon a change of the direction of movement of said racks.

6. The combination of a mutilated toothed gear, two racks connected to reciprocate in unison and lying at opposite sides of the gear, each rack having a movable tooth for the purpose specified, devices moving with the racks and connected with the movable teeth, and relatively stationary means adapted to be periodically engaged by said devices, whereby automatically to retract the teeth.

7. The combination of a mutilated toothed gear, two racks connected to reciprocate in unison, each rack having at each end a movable tooth, springs pressing one tooth of each rack yieldingly into position, said teeth being oppositely situate, devices moving with the racks and connected with the other movable teeth, and relatively stationary means adapted periodically to be engaged by said devices, whereby automatically to retract the teeth connected thereto.

8. The combination of a mutilated gear, a shaft on which the gear is mounted, racks connected to reciprocate in unison and engaging opposite sides of the gear, each rack having a movable tooth, and elbow-levers fulcrumed on the racks and connected with the movable teeth, said elbow-levers being adapted to periodically strike said shaft, for the purpose specified.

In testimony whereof I have signed my name to this specification in the presence of two subscribing witnesses.

FRED NEVELL LIVINGSTON.

Witnesses:
ANNA M. LIVINGSTON,
EMMA J. WILSON.